US007001233B2

(12) United States Patent
Gotell

(10) Patent No.: US 7,001,233 B2
(45) Date of Patent: Feb. 21, 2006

(54) STACKABLE BUOY WITH ROPE NESTING GROOVES

(76) Inventor: Blair Thomas Gotell, 683 Lower Road, P.O. Box 360, Arichat, Nova Scotia (CA) B0E 1A0

(*) Notice: Subject to any disclaimer, the term of this patent is extended or adjusted under 35 U.S.C. 154(b) by 0 days.

(21) Appl. No.: 10/830,473

(22) Filed: Apr. 23, 2004

(65) Prior Publication Data

US 2004/0229530 A1 Nov. 18, 2004

Related U.S. Application Data

(60) Provisional application No. 60/466,141, filed on Apr. 29, 2003.

(51) Int. Cl.
*B63B 22/00* (2006.01)

(52) U.S. Cl. .................................... 441/1; 441/6; 43/7

(58) Field of Classification Search .................... 441/1, 441/3, 6–10, 21, 23–32, 81, 83–85, 133, 441/136; 114/248, 253, 254, 267, 240 E, 114/241; 4/497, 504, 505; D10/107; 43/7, 43/8, 43.1, 43.14
See application file for complete search history.

(56) References Cited

U.S. PATENT DOCUMENTS

| | | | | |
|---|---|---|---|---|
| 1,821,320 | A * | 9/1931 | Plummer | 114/292 |
| 2,546,956 | A * | 3/1951 | Yeomans | 441/29 |
| 3,060,463 | A | 10/1962 | Pentzien | |
| 3,074,083 | A * | 1/1963 | Schirmer | 441/133 |
| 3,077,614 | A * | 2/1963 | Lloyd | 441/3 |
| 3,286,680 | A * | 11/1966 | Caretta | 114/219 |
| 3,793,657 | A * | 2/1974 | Kaas | 441/133 |
| 3,942,203 | A * | 3/1976 | Perkins | 441/28 |
| 4,332,048 | A | 6/1982 | Eddy | |
| 4,544,364 | A | 10/1985 | Bankston | |
| 4,584,958 | A * | 4/1986 | Green | 114/219 |
| 4,936,804 | A | 6/1990 | Dowdeswell | |
| 5,350,330 | A | 9/1994 | Platis | |
| D504,344 | S * | 4/2005 | Gotell | D10/107 |

FOREIGN PATENT DOCUMENTS

| | | | |
|---|---|---|---|
| CA | 454732 | | 2/1949 |
| CA | 879815 | | 9/1971 |
| CA | 933818 | | 9/1973 |
| CA | 956523 | | 10/1974 |
| EP | 15833 | A * | 9/1980 |
| FR | 2147364 | A * | 3/1973 |
| FR | 2450226 | A * | 10/1980 |
| GB | 2030947 | A * | 4/1980 |
| GB | 2225407 | A * | 5/1990 |
| JP | 58176311 | A * | 10/1983 |
| WO | WO 8700223 | A1 * | 1/1987 |

* cited by examiner

*Primary Examiner*—S. Joseph Morano
*Assistant Examiner*—Ajay Vasudeva
(74) *Attorney, Agent, or Firm*—Mario Theriault

(57) ABSTRACT

The buoy has small and large cylindrical sections contiguous with each other and having a common central axis. A hole extends along the common central axis, for receiving a mooring rope. The small section has dimensions to fitly engage into a cavity in the bottom of the large section, such that two buoys are stackable onto each other. In another aspect, the small section has grooves on its outside surface and the large section has notches in its rim. The grooves and the notches are advantageous for lodging a mooring rope and consequently for allowing the stacking of buoys that have their mooring ropes still attached to them.

20 Claims, 3 Drawing Sheets

STACKABLE BUOY WITH ROPE NESTING GROOVES

FIELD OF THE INVENTION

This invention pertains to stackable buoys and more particularly, it pertains to buoys that are stackable even though they may have mooring lines attached thereto.

BACKGROUND OF THE INVENTION

Buoys are used, for examples, as markers to locate fishing traps, as floats to support a fishnet in a fishing area or as markers for navigational points of reference. These buoys are transported by boats to and from a fishing area and stored in a dry place during the off-season periods.

The design of a buoy is done by giving the buoy sufficient volume to provide a required buoyancy. Although the volume of the buoy is not a concern when the buoy is in use on a body of water, it can cause difficulties during the transport and storage of the buoy. When the buoys are relatively large, it takes more trips to deploy a number of them, and more space in a warehouse to store them.

Although there is an incentive to make marine buoys stackable, the prior art literature is very limited in this field. It is believed that the prior art does not contain a practical design for a stackable buoy that is suitable for the fishing industry.

Examples of the prior art stackable buoys are:

U.S. Pat. No. 3,060,463 issued to L. I. Pentzien on Oct. 30, 1962;

U.S. Pat. No. 4,936, 804 issued to M. R. Dowdeswell on Jun. 26, 1990;

U.S. Pat. No. 5,350,330 issued to G. W. Platis on Sep. 27, 1994;

CA Patent 933,818 issued to C. D. Inman on Sep. 18, 1973;

CA Patent 879,815 issued to S. N. Schlein on Aug. 31, 1971;

The above prior art floats and buoys have either a tapering skeletal structure or a shell-like form. In both types, their ratio of buoyancy over volume is relatively small, which makes them inappropriate for use in commercial fishing applications.

Therefore, it is believed that a market demand still exists for a stackable buoy that has a form that can displace a relatively large volume of water, and that can be transported and stored in a space that corresponds to only a portion of its actual volume.

SUMMARY OF THE INVENTION

In the present invention, however, there is provided a buoy that has a small portion and a large portion. The small portion of one buoy fits into the large portion of another buoy such that two buoys are stackable onto one another. In the stacked mode, a pair of buoys take about 30% less space than the sum of their respective overall volumes. Such space saving has associated advantages in reducing warehousing space and transportation costs.

In a broad aspect, the buoy according to the present invention comprises small and large cylindrical sections contiguous with each other and having a common central axis. A hole extends along the common central axis, for receiving a mooring rope. The small section has an outside length and an outside diameter. The large section has a cylindrical cavity therein along the central axis. This cavity has an inside length and an inside diameter. The inside length of the cavity is slightly longer than the outside length of the small section, and the inside diameter of the cavity is slightly larger than the outside diameter of the small section.

In another aspect of the present invention, the small section further has an outside cylindrical surface and an end surface substantially perpendicular to the central axis. The large section has a rim around the cylindrical cavity. The end surface has a diametrical groove there across. The outside cylindrical surface of the small section has a longitudinal groove extending longitudinally thereon from the diametrical groove to the shoulder of the large section. The diametrical groove and the longitudinal groove define a longitudinal plane along the central axis. The rim has a radial notch therein extending along the plane mentioned above.

The diametrical groove and the longitudinal groove define a rope nesting groove along the small portion of the buoy, to enclose a rope when the small section is nested in the cylindrical cavity of another buoy. The notch in the rim of the large section provides a passage through which the rope nested in the grooves of the small section can exit the large section. The diametrical groove, the longitudinal groove and the notch are advantageous for allowing the stacking of buoys that have their mooring ropes still attached to them.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Two embodiments of the present invention are illustrated in the accompanying drawings, in which like numerals denote like parts throughout the several views, and in which.

DESCRIPTION OF THE PREFERRED EMBODIMENTS

Figure 2:
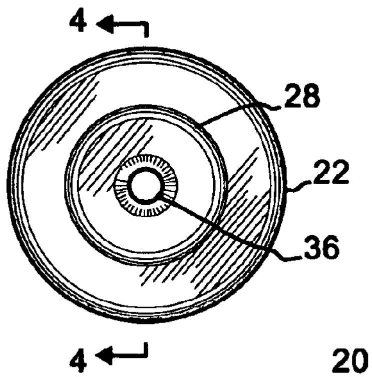
FIG. 2 is a top view of the stackable buoy illustrated in FIG. 1.
Figure 1:
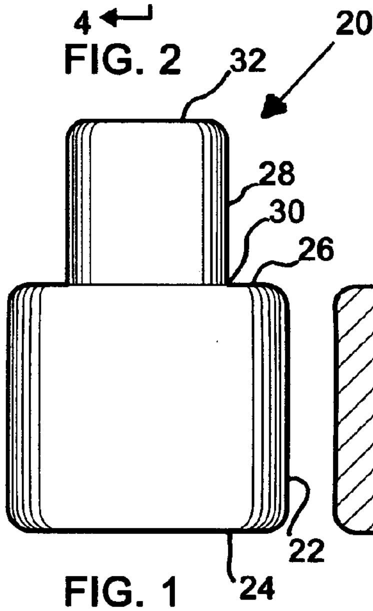
FIG. 1 is a side view of the stackable buoy according to a first preferred embodiment of the present invention.
Figure 4:
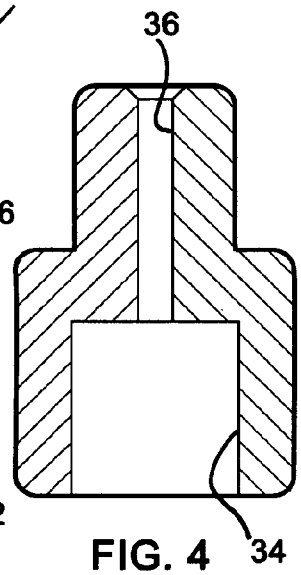
FIG. 4 is vertical cross-section view of the stackable buoy as seen along line 4—4 in FIG. 2.
Figure 5:
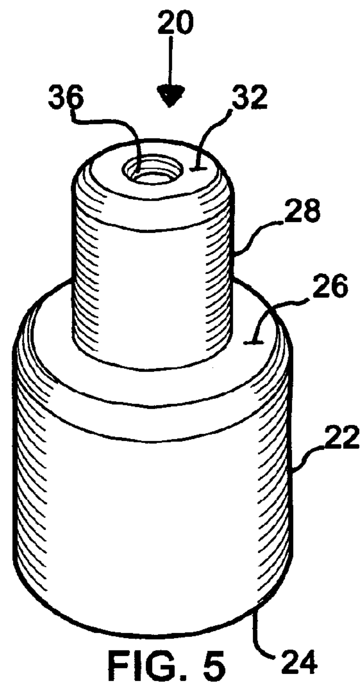
FIG. 5 is a perspective side view of the stackable buoy of FIG. 1.
Figure 3:
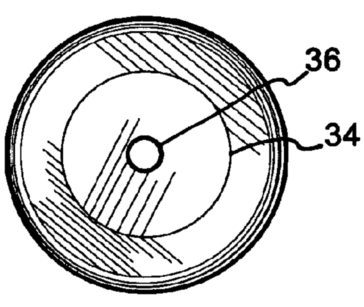
FIG. 3 is a bottom view of the stackable buoy illustrated in FIG. 1.
Figure 7:
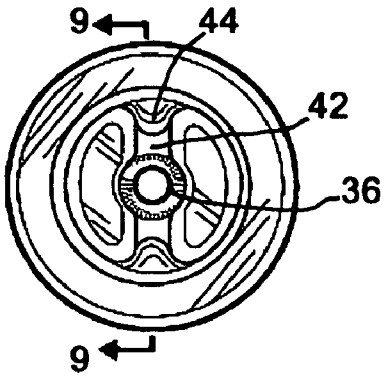
FIG. 7 is a top view of the stackable buoy according to the second preferred embodiment.
Figure 6:
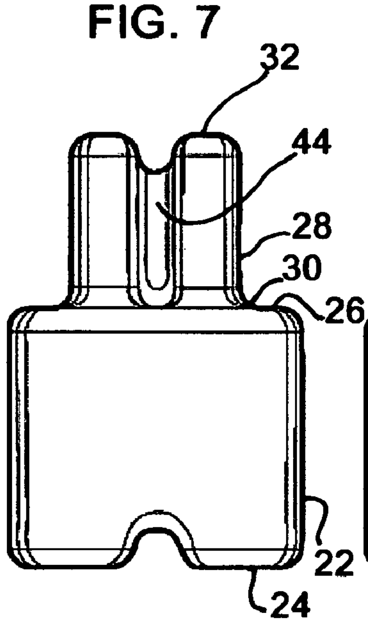
FIG. 6 is a side view of the stackable buoy according to the second preferred embodiment of the present invention.
Figure 9:
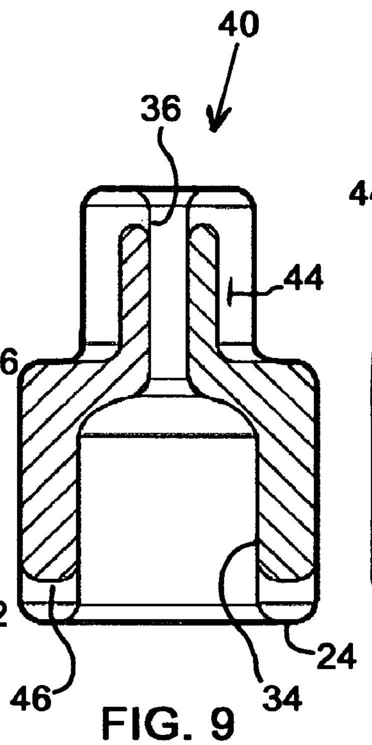
FIG. 9 is a vertical cross-section view of the stackable buoy as seen along line 9—9 in FIG. 7.
Figure 10:
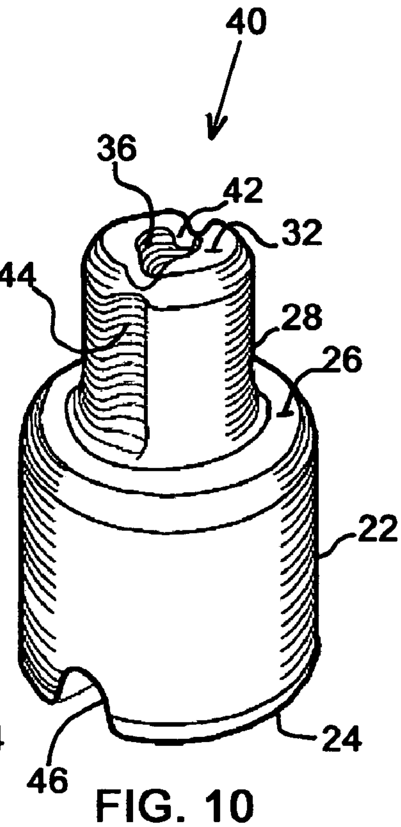
FIG. 10 is a perspective side view of the stackable buoy according to the second preferred embodiment.
Figure 8:
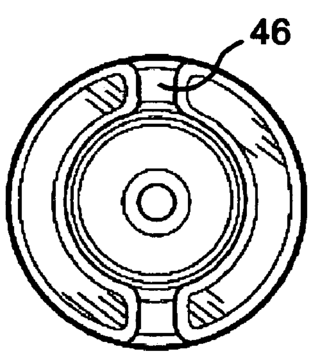
FIG. 8 is a bottom view of the stackable buoy in FIG. 6.

While this invention is susceptible to embodiment in many different forms, there is shown in the drawings and will be described in detail herein, two specific embodiments, with the understanding that the present disclosure is to be considered as an example of the principles of the invention and is not intended to limit the invention to the embodiments illustrated and described.

Referring to FIGS. 1–5, the buoy 20 according to the first preferred embodiment has a cylindrical shape made of two sections joined end to end. The first section 22 has a cylindrical large shape defined by a rim 24 and a shoulder end 26. For convenience, the first section 22 is also referred to herein as the large section 22. The second section 28 has a cylindrical small shape and is defined by a base 30 and an end surface 32. Also for convenience, the second section 28 is also referred to herein as the small section 28. The small section 28 is contiguous with the shoulder end 26 of the large section 22.

The large section 22 has a cavity 34 in its core. This cavity has dimensions to fitly receive the small section 28 and to enclose the small section completely.

The small section 28 has a hole 36 there through along its central longitudinal axis. For reference purposes, the outside diameter of the small section 28 should be about 2%–5% smaller than the inside diameter of the cylindrical cavity 34. For convenience, both the small section 28 and the cylindrical cavity 34 may have tapering wall surfaces to facilitate stacking and unstacking of several buoys 20 on top of one another. All inside and outside comers or edges should be rounded with a radius of no less than 0.5 inch. The centre hole 36 should be about 15–20% of the outside diameter of the small section 28. The outside diameter of the large section 22 can be of any dimension, depending upon the buoyancy required.

The buoy is manufactured from a plastic material such as polyethylene, in a process such as rotational or blow molding capable of producing a rigid hollow part from a plastic or composite material. An optional secondary process, may include the injection of a rigid polyurethane foam into the hollow space between walls made of polyethylene. The liquid foam is injected through small holes in the outer shell of the buoy, and after the foam has expanded and set, the holes are sealed with caps made of polyethylene. This foam core provides additional rigidity and improves structural strength in addition to ensuring permanent buoyancy should the outer polyethylene shell become punctured or cut.

It may also be contemplated that the buoy 20 may also be manufactured using a molding process and a single material such as a closed cell polyethylene foam or Styrofoam™.

The hole 36 through the small section 28 is used to thread a rope therein to retain the buoy 20 to its designated assignment. In use, a knot (not shown) at the end of the rope (not shown) rests against the bottom of the cylindrical cavity 34 with the rope extending through and away from the end surface 32 of the buoy 20. For that reason, the height of the cylindrical cavity 34 should be about 20–25% more than the length of the small section 28. The extra space accommodates for the volume taken by the knot.

Referring now to FIGS. 6–10, the buoy 40 according to the second preferred embodiment of the present invention will be described. The dimensions, shape and material of construction described above for the buoy 20 according to the first preferred embodiment also apply to the buoy 40 according to the second preferred embodiment.

The buoy 40 according to the second preferred embodiment, differs from the previously described buoy in that it has rope nesting grooves thereon to accommodate the stacking of several buoys 40 with their mooring lines still attached to them.

These rope nesting grooves consist firstly of a first diametrical groove 42 extending along the diameter of the end surface 32. Secondly, a pair of longitudinal grooves 44 extend from the diametrical groove 42, along the full length of the small section 28 on its outside surface. Thirdly, the rim 24 of the large section 22 has a pair of notches 46 therein aligned with the diametrical slot 42. The depth and width of the grooves 42, 44, 46 are substantially the same as the diameter of the hole 36 through the centre of the small section 28. For convenience, two longitudinal grooves 44 and two notches 46 are provided to allow the nesting of rope on either side of the buoy 40.

Figure 11:
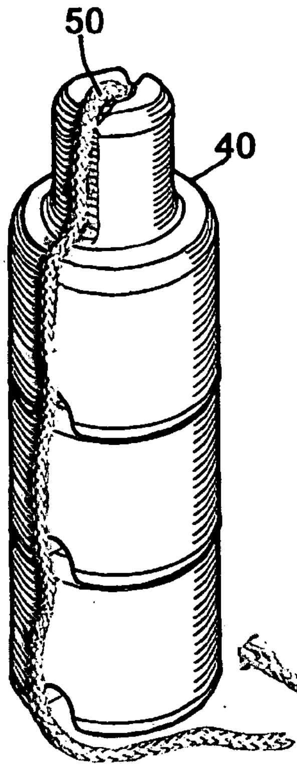
FIGS. 11–13 shows three stacks of buoys according to the second preferred embodiment with different arrangements of mooring ropes.
Figure 12:
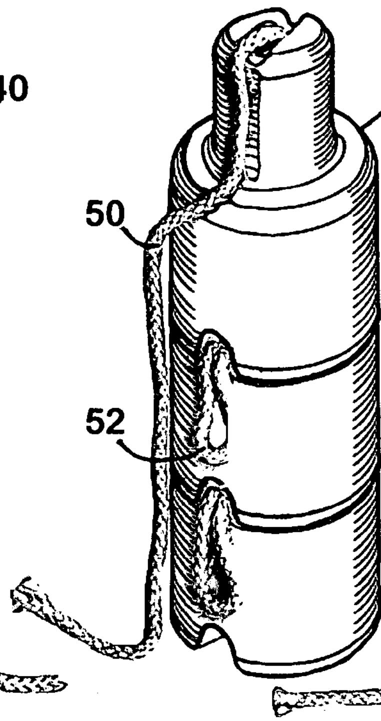
Figure 13:
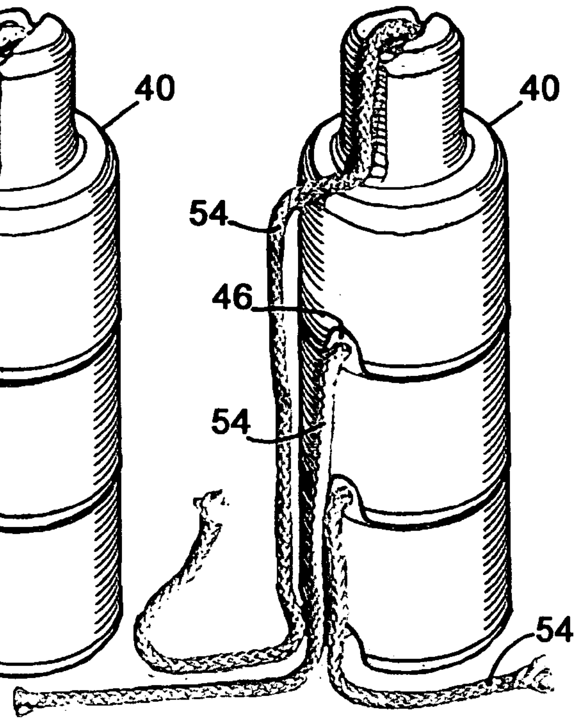

In use, several buoys 40 can be stacked on top of one another with a common rope 50 passing through all of them as illustrated in FIG. 11. In another arrangement illustrated in FIG. 12, the buoys 40 are also stackable when the buoys are mounted on a single rope, with substantial rope length 52 between each buoy. In a third arrangement illustrated in FIG. 13, the buoys are stackable with individual mooring lines 54 attached to them. It will be appreciated that the ropes 52, 54 are nested in the grooves 42 and 44, and in the notches 46 to afford stacking of the buoys 40.

Figure 14:
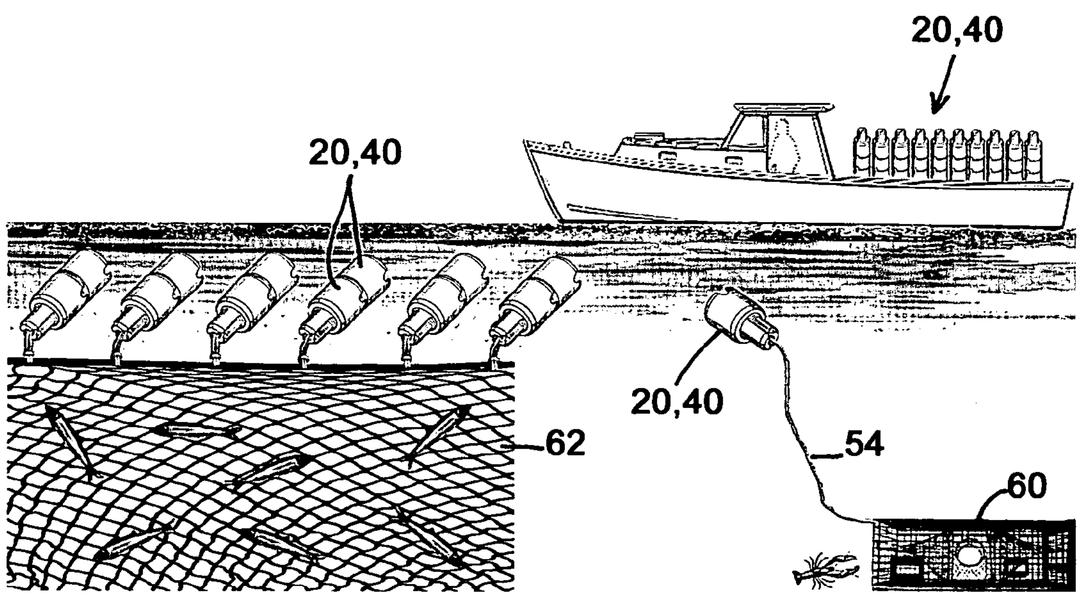
FIG. 14 illustrates the stackable buoys according to the second preferred embodiment in use in various commercial applications.

Referring now to FIG. 14, it will be appreciated that the buoys 20,40 are stackable in a boat to reduce the number of trips to a fishing area. The buoy according to the first or second preferred embodiment is usable alone for marking the location of a lobster trap 60 for example. The buoys 20, 40 according to the first or second preferred embodiment are usable in pairs or in other combinations for supporting a fishnet 62 for example.

During off-season periods, the fishing gear 60, 62 including the buoys in a stacked mode with their mooring rope 54 attached thereto are more easily transported and stowed away.

As to other manners of usage and operation of the buoys according to the present invention, the same should be apparent from the above description and accompanying drawings, and accordingly further discussion relative to the manner of usage and operation of the invention would be considered repetitious and is not provided.

While two embodiments of the present invention have been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A buoy comprising;

first and second cylindrical sections contiguous with each other and having a common central axis, and a hole there through along said central axis for receiving a mooring rope;

said first section having a cylindrical cavity therein along said central axis; said cavity having an inside length and an inside diameter;

said second section having an outside length and an outside diameter, said inside length being longer than said outside length and said inside diameter being larger than said outside diameter;

said second section also having an outside cylindrical surface and an end surface substantially perpendicular to said central axis; said end surface having a diametrical groove there-across;

said outside cylindrical surface having a first groove extending from said diametrical groove and along said outside length; said diametrical groove and said first groove defining a longitudinal plane along said central axis.

2. The buoy as claimed in claim 1, where in said hole in said second section is about 15–20% of said outside diameter.

3. The buoy as claimed in claim 1, wherein a material of construction thereof is a polyethylene casing with a polyurethane core.

4. The buoy as claimed in claim 1, wherein said inside length is about 20–25% longer than said outside length.

5. The buoy as claimed in claim 1, wherein said outside diameter is about 2–5% smaller than said inside diameter.

6. The buoy as claimed in claim 1, wherein said first section a rim around said cavity and said rim has a first radial notch therein.

7. The buoy as claimed in claim 6, wherein said first radial notch extends along said longitudinal plane.

8. The buoy as claimed in claim 7, wherein said outside surface of said second section has a second groove extending along said outside length and said longitudinal plane, diametrically opposite said first groove.

9. The buoy as claimed in claim 8, wherein said rim has a second radial notch therein extending diametrically opposite said first notch along said longitudinal plane.

10. A pair of buoys comprising of first and second buoys, each having a respective volume and each comprising:

first and second cylindrical sections contiguous with each other and having a common central axis and a hole there through along said central axis for receiving a mooring rope;

said first section having a cylindrical cavity therein along said axis; said cavity having an inside length, an inside diameter and a rim;

said second section having an outside cylindrical surface, an outside length, an outside diameter and an end surface substantially perpendicular to said central axis;

said inside length being longer than said outside length and said inside diameter being larger than said outside diameter;

said end surface having a diametrical groove there across;

said outside surface of said second section having a first groove extending from said diametrical groove and along said outside length; said diametrical groove and said first groove defining a longitudinal plane along said central axis;

said rim having a first radial notch therein extending along said plane, and said second section in said first buoy being mounted in said cavity of said second buoy.

11. The pair of buoys as claimed in claim 10, further comprising a second groove extending from said diametrical groove and along said outside length along said plane, and said rim has a second radial notch therein extending along said plane.

12. The pair of buoys as claimed in claim 10 further comprising a rope extending from inside said first buoy, along said central hole in said first buoy, through said diametrical groove in said first buoy, along said first groove in said second section of said first buoy, and outside said second buoy through said first radial notch in said rim of said second buoy.

13. A buoy comprising;

first and second cylindrical sections contiguous with each other and having a common central axis, and a hole there through along said central axis for receiving a mooring rope;

said first section having a cylindrical cavity therein along said central axis; said cavity having an inside length and an inside diameter;

said second section having an outside length and an outside diameter;

said inside length being longer than said outside length and said inside diameter being larger than said outside diameter;

said second section also having an outside cylindrical surface and an end surface substantially perpendicular to said common central axis; said outside cylindrical surface having a first groove therein extending along said outside length and said common central axis.

14. The buoy as claimed in claim 13 wherein a width of said first groove is substantially a same dimension as a diameter of said hole in said second section.

15. The buoy as claimed in claim 14, wherein a depth of said first groove is substantially a same dimension as said diameter of said hole in said second section.

16. The buoy as claimed in claim 13, further comprising a diametrical groove extending across said end surface and joining said first groove.

17. The buoy as claimed in claim 16, wherein said diametrical groove and said first groove define a longitudinal plane along said central axis.

18. The buoy as claimed in claim 17, wherein said first section has a rim around said cavity and said rim has a first radial notch therein, and said first radial notch extends along said longitudinal plane.

19. The buoy as claimed in claim 18, wherein said outside surface of said second section has a second groove therein extending along said outside length and said longitudinal plane, diametrically opposite said first groove.

20. The buoy as claimed in claim 19, wherein said rim has a second radial notch therein extending diametrically opposite said first notch along said longitudinal plane.

* * * * *